United States Patent
Wohlfeil et al.

(10) Patent No.: US 9,034,132 B2
(45) Date of Patent: May 19, 2015

(54) METHOD FOR FIXING A BEARING RING ON OR IN A COMPONENT

(75) Inventors: Florian Wohlfeil, Niederwerrn (DE); Wilhelm Meyer, Reichmannshausen (DE)

(73) Assignee: AKTIEBOLAGET SKF, Gothenburg (SE)

(*) Notice: Subject to any disclaimer, the term of this patent is extended or adjusted under 35 U.S.C. 154(b) by 30 days.

(21) Appl. No.: 13/521,596

(22) PCT Filed: Jan. 5, 2011

(86) PCT No.: PCT/EP2011/050089
§ 371 (c)(1),
(2), (4) Date: Nov. 7, 2012

(87) PCT Pub. No.: WO2011/086017
PCT Pub. Date: Jul. 21, 2011

(65) Prior Publication Data
US 2013/0192743 A1 Aug. 1, 2013

(30) Foreign Application Priority Data
Jan. 16, 2010 (DE) .......................... 10 2010 004 792

(51) Int. Cl.
| B29C 65/02 | (2006.01) |
| F16C 35/063 | (2006.01) |
| C09J 5/00 | (2006.01) |
| F16D 1/068 | (2006.01) |
| F16C 19/06 | (2006.01) |
| F16B 11/00 | (2006.01) |

(52) U.S. Cl.
CPC ............... *B29C 65/02* (2013.01); *F16C 35/063* (2013.01); *C09J 5/00* (2013.01); *F16D 1/068* (2013.01); *F16C 19/06* (2013.01); *F16B 11/008* (2013.01)

(58) Field of Classification Search
CPC .......................................................... B29C 65/02
USPC ................................................... 156/79, 325
See application file for complete search history.

(56) References Cited

U.S. PATENT DOCUMENTS 7,252,882 B2 * 8/2007 Satake et al. ............. 428/402.22
7,919,555 B2 * 4/2011 Agarwal et al. ............... 524/500

FOREIGN PATENT DOCUMENTS

| DE | 2203664 A1 | | 8/1973 |
| DE | 10236701 A1 | | 2/2004 |
| DE | 102007052574 A1 | * | 5/2009 |
| EP | 0354498 A2 | | 2/1990 |
| WO | WO9300381 A1 | | 1/1993 |
| WO | WO0037554 A1 | | 6/2000 |

* cited by examiner

*Primary Examiner* — Daniel Lee
(74) *Attorney, Agent, or Firm* — Bryan Peckijian; SKF USA Inc. Patent Dept.

(57) ABSTRACT

A method for fixing a bearing ring on or in a component includes applying an adhesive to a surface of the bearing ring having a least one annular groove-shaped receiving space defined therein such that the adhesive at least partially fills the at least one annular groove-shaped receiving space. The adhesive is allowed to pre-cure on the surface until the adhesive is no longer sticky and then the bearing ring and the component are joined in a desired relative position, such a radial distance between a base of the at least one annular groove-shaped receiving space and the component is larger than a radial distance between the surface and the component. The adhesive is then activated so that the adhesive increases in volume and produces an adhesive bond between the bearing ring and the component.

3 Claims, 2 Drawing Sheets

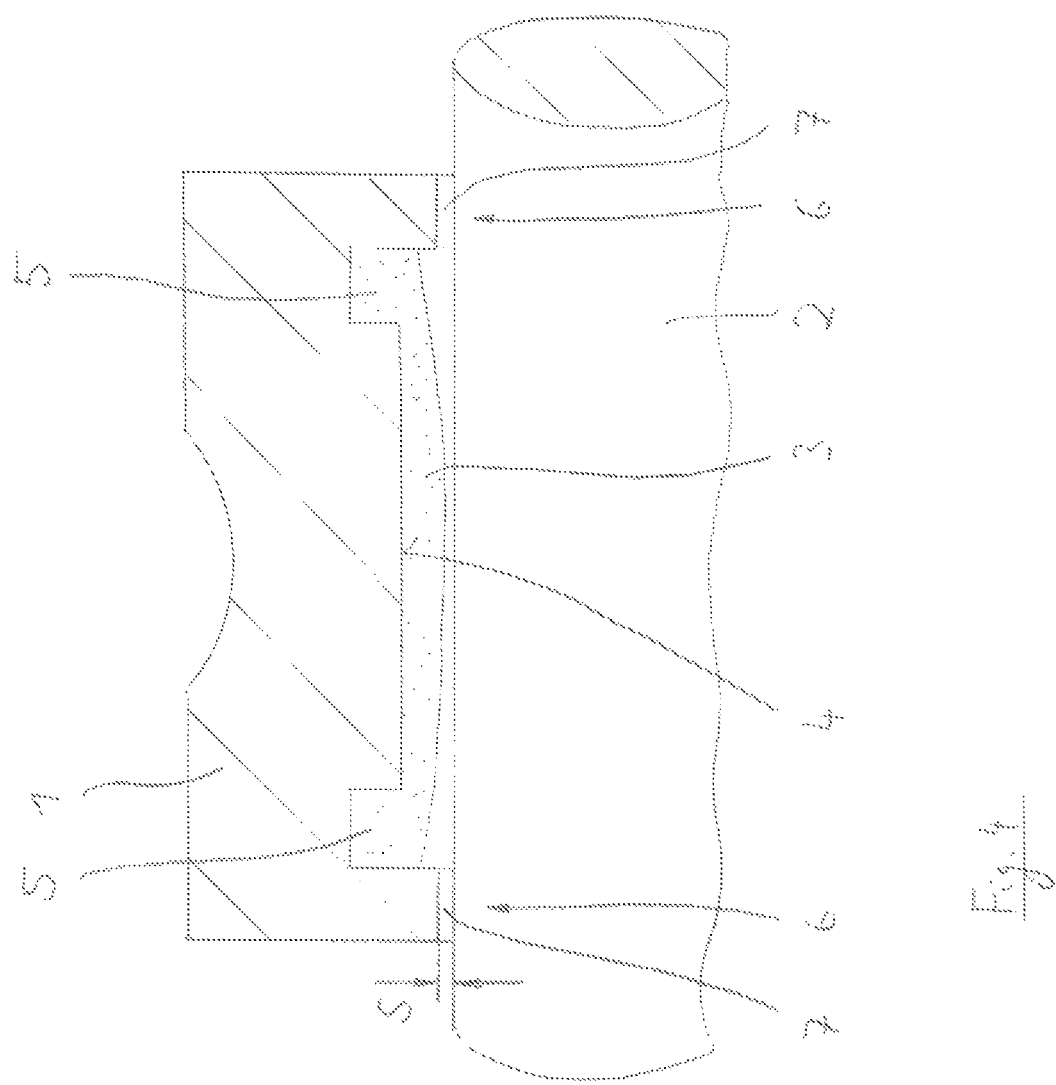

METHOD FOR FIXING A BEARING RING ON OR IN A COMPONENT

CROSS-REFERENCE

This application is the U.S. national stage of International Application No. PCT/EP2011/050089 filed on Jan. 5, 2011, which claims priority to German patent application no. 10 2010 004 792.9 filed on Jan. 16, 2010.

TECHNICAL FIELD

The invention relates to a method for fixing a bearing ring on or in a component using an adhesive connection.

RELATED ART

In various cases, e.g. with the use of long, rotatably-supported shafts, the free positionability and a fixed seat of the bearing on the component to be rotatably-supported are very important when assembling rolling-element bearings. Of course the economic costs for the realization of the attachment also play a large role.

First, mechanical solutions are known and common for the fixing. Here adapter sleeves are used, which produce a friction-fit connection over a tapered seat. Further, eccentric rings are known, with which a fixed bond can be produced between the bearing and the component to be rotatably-supported. Screw connections are frequently used. In this case, in particular set screws are used, which are screwed into a connecting part radially to the shaft, to fix the bearing on the in particular shaft-shaped component.

Furthermore, it is disadvantageous with the attachment using an adapter sleeve that at least three components are required for the attachment. These must have a relatively high precision, which causes corresponding costs. In addition to the manufacturing expenses and costs, multiple components also mean an accumulation of manufacturing tolerances. Depending on the situation of the actual dimensions, these can add up unfavorably.

A further problem in the mounting of an adapter sleeve is that the cross-section of the sleeve, for strength reasons, must be chosen to be so large that, with the exception of incorporated adapter sleeves (special sleeves), the respective next larger bearing number must be chosen, in order not to weaken the bearing ring too much on the other side. This fact restricts the flexibility of construction.

For example, the change of a set screw attachment to an adapter sleeve attachment also requires an adaptation of the installation space. Especially with performance increases (e.g. with higher rotational speeds) of machines, which require a higher running accuracy, this means that the application can no longer be constructed as compactly.

A specific problem with the use of adapter sleeves is that the desired location of the bearing during mounting over the insertion can only be defined with difficulty. This means in practice that the press fit must be repeatedly released in order to be able to carry out a new positioning; in the alternative, constructive measures must be taken, e.g. a specialized mounting device must be prepared. Even the positioning of the fixed bearing allows no deviation from the intended position, otherwise the position of the shaft relative to the surrounding structure restricts the function under certain circumstances.

With the use of screw connectors and eccentric rings, the problem is that, due to this attachment possibility, a tilting of the bearing ring towards a shaft-shaped component can occur. This leads to a reduced running smoothness and/or running accuracy.

Furthermore there is the problem that the type of fastening may not be sufficient relative to the load to completely prevent micro-movements. Frictional corrosion with corresponding consequential damage is often observed in the fitted joints of such bearings. If the attachment is, however, too highly strained, the attachment means (especially the set screw) can be damaged.

With regard to the strength of the attachment of the bearing ring to the component, it is a negative that the transmission of axial forces can be significantly limited. Especially with the use of set screws, a deformation of the bearing ring also occurs as a result of a too-strong tightening of the screws, which leads to an unfavorable running performance and to strains. This must be compensated by a correspondingly large clearance. An increased clearance brings with it however in turn the disadvantages of an unfavorable support ratio in the bearing. Otherwise it is true that the radial clearance is also influenced by the mounting. Depending on the type of bearing (e.g. especially with deep-groove ball bearings), the extent of the clearance reduction is difficult to control. This can lead to the bearing being strained radially. This necessitates an extensive monitoring of the mounting and/or yields a bearing with reduced lifespan.

The following is additionally disadvantageous: The set screw achieves its strength through the digging-in into the material of the component (shaft), i.e. through an interference fit. Since this leads to a bulge on the shaft, the dismounting of the bearing is made more difficult.

A specific problem of the eccentric ring is that a fixed connection can only be achieved through twisting two rings relative to each other. This means, however, that a breathing of the fitting joint can occur when the rotational direction of the bearing rapidly changes and can thereby loosen the bond.

It is also known to provide an adhesive connection for the attachment of a bearing on or in a component. One such solution is for example described in DE 22 03 664 AI. Here, during the mounting the adhesive is directly introduced into the fitting joint between the parts to be connected. This method has the disadvantage that the introduction of an adhesive in assembly lines is difficult to design and/or the process reliability—especially with regard to the amount of adhesive to be supplied and with respect to the cleanliness of the joining partner—depends on the conditions during the mounting and/or on each assembly worker.

Furthermore with the previously known solution, there is the disadvantage that, during manual introduction of the adhesive, surrounding components, such as for example seals, can be wetted with adhesive. The function of such a component can hereby be disadvantageously influenced.

Further it is known from DE 10 2007 052 574 AI to incorporate an annular groove into the bearing inner ring to be adhesively bonded with a shaft, in which annular groove a slotted hollow cylindrical ring of adhesive material is inserted. When the shaft and bearing ring are disposed in the desired relative position, the adhesive is activated, whereby the desired adhesive bond results. Although a stable adhesive connection can already be produced therewith, which represents an easily handleable technology, due to the separate part a relatively large gap must be provided here between the shaft and the bearing ring, which restricts the adhesive load bearing capacity at least in this region.

SUMMARY

Therefore in one aspect of the present teachings, a method is disclosed for fixing a bearing ring on or in a component using an adhesive connection, such that a further improved handling and simpler and therefore more economical connection can be produced. Thereby a higher load bearing capacity of the adhesive is also sought than with the previously known solution.

In another aspect of the present teachings, the method includes the steps:

a) Applying the adhesive to a surface of the bearing ring that is provided for adhesive bonding to the component;

b) Allowing the adhesive to pre-cure on the surface, so that the adhesive no longer has an adhesive property;

c) Joining the bearing ring and the component in the desired relative position;

d) Activating the adhesive in such a way that it produces an adhesive bond between the bearing ring and the component.

When applying the adhesive according to step a) above, adhesive having a pasty consistency is preferably used.

When the adhesive is activated according to step d) above, an increase in volume of the adhesive is especially preferable. For the purpose of this increase in volume, an adhesive is preferably used, into which a chemical or physical foaming agent is added.

The activation of the adhesive according to step d) above can occur through supplying heat energy to the adhesive, in particular through induction. It is also possible that the activation of the adhesive occurs through application of ultrasound.

In the surface of the bearing ring facing the component, a receiving space for adhesive can be disposed, which receiving space is at least partly filled with adhesive during the application of the adhesive according to step a) above. The receiving space can be formed by at least one annular grove. The area adjacent to the receiving space and facing an axial end of the bearing ring can have a reduced radial gap distance between the bearing ring and the component, which radial gap distance forms a barrier for the adhesive. In this way the activated and enlarged-in-volume synthetic material cannot flow outward so easily, but rather a certain pressure is established in the space between bearing ring and component. That is, there is a certain pretension in the ring space between inner ring and shaft. With uniform expansion, the bearing ring and the shaft are in this way also centered relative to each other in an advantageous way.

In the following, adhesion is understood to include the adhesion between the adhesive and the surface of the bearing ring and/or the component.

The joining of the component and of the bearing ring occurs in a state of the adhesive in which it is not yet "adhered". Only after the reaching of the exact relative position between the components to be connected is the adhesive "activated", so that the adhesive bond is produced.

The flow of the adhesive can, after its activation, be limited in the axial direction between the bearing ring and component by at least one barrier element, which—as mentioned—can be embodied as a gap having a reduced gap distance. A sealing ring can also be considered as barrier element, which sealing ring can be formed as an O-ring. On the other hand here it can also be a calibration ring. The barrier element is thereby preferably disposed in an annular groove in the bearing ring or in the component.

The bearing ring is preferably the inner ring of a rolling-element bearing and the component is then a shaft. But it is also equally possible that the bearing ring is the outer ring of a rolling-element bearing and the component is a housing.

The proposed methodology offers the advantage that a stable adhesive bond is producible in a cost-effective way. Different materials with different material characteristics can be bonded with each other in a problem-free way.

BRIEF DESCRIPTION OF THE DRAWINGS

In the drawings, exemplary embodiments of the invention are depicted:

FIG. 4 shows the radial section through the inner ring, wherein here some details of the design are depicted, which were omitted in FIG. 1.

DETAILED DESCRIPTION OF THE INVENTION

Figure 1:
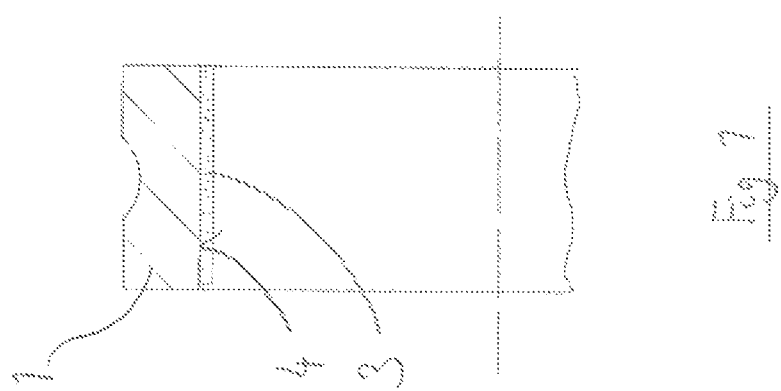
FIG. 1 shows the radial section through an inner ring of a rolling-element bearing, wherein an adhesive has been applied to the inner bore.

In FIG. 1 an inner ring 1 of a ball bearing is drawn, which ball bearing is to be connected with a shaft that is not depicted in FIG. 1, and namely through an adhesive process. For this purpose an adhesive 3 is applied to the inner cylindrical surface 4 of the inner ring 1. This adhesive 3 has, when applied to the inner ring 1, a pasty consistency. When it is applied, a pre-curing of the adhesive 3 occurs. This can occur in the air through a sufficiently long holding of the inner ring 1 together with adhesive 3. The adhesive 3 "dries" in this way, so that the adhesive layer not only obtains a certain mechanical stability, but also no longer significantly adheres when the adhesive 3 is touched. Accordingly, the further handling of inner ring 1 provided with adhesive 3 is simple, as no special precautions must be taken during the handling and/or during the transport.

Figure 2:
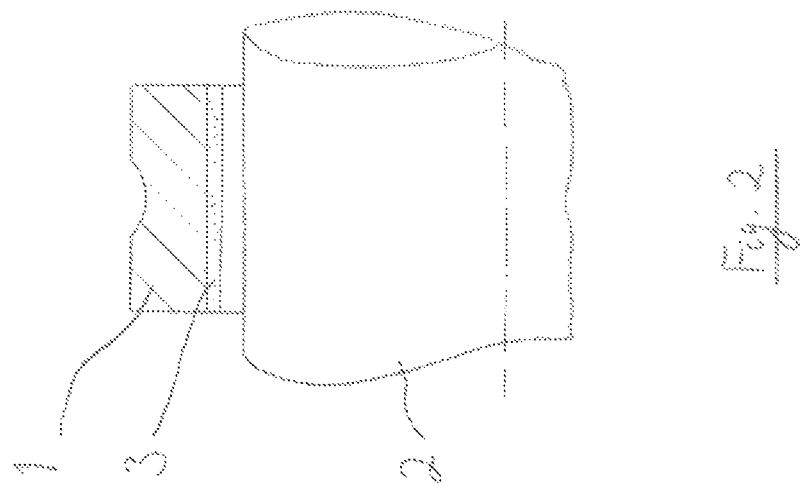
FIG. 2 shows the inner ring according to FIG. 1, into which a shaft has now been inserted, which is to be fixedly connected with the inner ring.

The thus-prepared inner ring 1 (which of course may already be connected with the not-depicted bearing outer ring and the rolling elements) is then brought to the site of mounting, at which it is connected with a shaft 2, as is drawn in FIG. 2. Accordingly the shaft 2 is inserted into the inner ring bore. It is depicted that there is a radial gap between the surface of the adhesive 3 and the outer circumference of the shaft 2, wherein the gap is depicted here in a greatly exaggerated manner.

Figure 3:
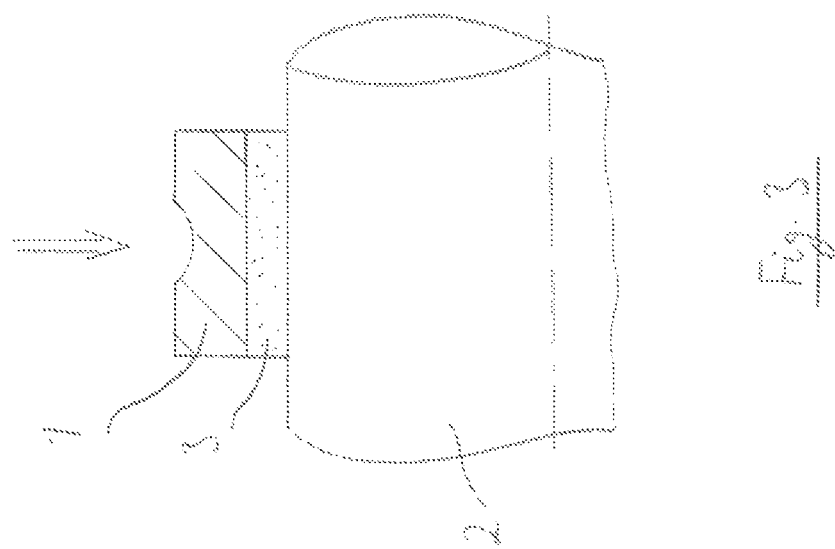
FIG. 3 shows the process of the activation of the adhesive, whereby an adhesive bond results between inner ring and shaft.

For the preparation of the adhesive connection—which is indicated in FIG. 3—the adhesive 3 is now activated, which is symbolized by the arrow. This can be here for example a heating of the adhesive 3. Through the activation, in the exemplary embodiment the volume of the adhesive 3 increases, so that the—here exaggeratedly large—gap between shaft 2 and adhesive 3 is closed and an adhesive connection is produced between the inner ring 1 and the shaft 2.

In FIG. 4 it is indicated how the surface 4 can be formed, onto which the adhesive 3 is applied. It can be seen that two receiving spaces 5, each in the form of an annular groove, are incorporated into the lateral end portions of the bearing ring 1 (of course also only one annular groove or more than two are possible). In the outwardly adjoining areas 6, the bore of the inner ring 1 is somewhat reduced in diameter, so that a relatively narrow gap 7 with a gap distance s results. In this way a barrier effect for the adhesive 3 is achieved when this adhesive is activated and consequently experiences an increase in volume.

Due to the design of the bore of the inner ring according to FIG. 4, the expanding adhesive 3 can expand first in the radial direction. After reaching the joint gap between inner ring and shaft, in addition to the radial expansion, an expansion of the adhesive in the axial direction also occurs, which causes an additional strength effect. This effect of the axial expansion can also be influenced through the design of the course of the gap between inner ring and shaft.

A groove extending in a spiral-shape can also be incorporated, if necessary, into the bore diameter of the inner ring 1, which groove facilitates the distribution of the adhesive 3 in the space between inner ring 1 and shaft 2.

An adhesive can be used which has a solid consistency at typical ambient temperatures (between 0° C. and 50° C.). The adhesive accordingly has not only a solid consistency at typical ambient temperatures, it also has no adhesive property.

Generally hot melt adhesives can be used (also referred to as "hotmelts"). These are solid at room temperature. They are processable through melting, i.e. upon heating they develop their adhesive effect. An activation by temperature therefore occurs here. The hot adhesive melt brings about the adhesive bond. Immediately after the cooling and solidification of the adhesive, the connection is fixed. This allows, in an advantageous way, a rapid mounting. Contact adhesives can also be used.

Furthermore anaerobically-curing adhesives can be used. These adhesives are used as a one-component system. The monomers of (modified) acrylic acid esters cure according to a radical chain mechanism similar to the methyl methacrylates. What is special here is that the curing reaction only starts in the absence of oxygen, i.e. anaerobically, and in the presence of metal ions when the adhesive is isolated from the ambient air in a narrow metallic bondline. Only metallic materials can be adhered in this way, which is advantageous for the present invention, since free metal ions are required as reactants for the curing.

Other preferred adhesives, which can be used advantageously in the present invention, are radiation-curing adhesives. With these adhesives, which are used as one-component systems, curing is brought about by radical polymerization into solid polymers, wherein the formation of initiating radicals is caused by irradiation with UV light (or other radiation sources, such as for example electrons). The wavelength of the UV light must here be exactly matched to the adhesive system used. Curing occurs by irradiation with UV light. Multiple variants are possible here: First, UV acrylates are known. In the liquid state, a radical cross-linking UV adhesive consists predominantly of monomers and photoinitiators. In this state the adhesive can be easily dispensed. Due to the effect of UV radiation, the photo-initiators are split into free radicals. These radicals initiate the formation of polymer chains. In the cured state the UV adhesive consists of crosslinked polymer chains. Furthermore, cationic epoxies (epoxy resin adhesives) can be used to adhere non-transparent substrates, which is advantageous in this case. In contrast to the radical curing acrylate adhesives, the cationic curing adhesive system can, after a sufficient activation with UV radiation, further cure in the dark. Cationic epoxies can be used in applications with a UV-transparent component, as well as in applications with non-UV-transparent materials. In the latter the adhesive must be activated with UV radiation after the dispensing, however before the joining. After the activation the adhesive has a limited open time, in which the components must be joined.

The increase in volume of the adhesive upon its activation is very advantageous.

For this purpose the adhesive preferably contains a physically- or chemically-acting foaming agent, which upon the activation of the foaming agent is itself activated and that increases the volume of the adhesive through the formation of gas or gas expansion.

In the case of physically-acting foaming agents, the increase in volume is a physical consequence of the warming of hollow microspheres filled with gas or vaporizable liquid.

In the case of chemical foaming agents, a gas is formed through a chemical reaction, which gas causes the increase in volume of the adhesive.

Due to the increase in volume following the activation, it is not required that the area between the inner ring and the shaft must be excessively precisely toleranced to each other. Rather, a gap between adhesive and inner bore of the inner ring is allowed to remain, which facilitates the joining of the two parts. Due to the increase in volume, the adhesive fills in the gap after the activation and thereby cohesively connects the two parts.

For the proposed method an adhesive based on polyurethanes, epoxy resins or acrylates can be used. Here, the term "acrylate" includes substituted acrylates such as methacrylate.

Examples of adhesives that have proven themselves are so-called "reactive hot melt adhesives". These are spreadable in a molten state, so that they can be applied to the inner bore of the inner ring in this state, without the curing mechanism being activated. This activation requires instead a heating to a higher-lying activation temperature, at which a latent hardener for a reactive binder component (for example a prepolymer with epoxy or isocyanate groups) is activated.

For this purpose attention is given in an exemplary manner to EP 0 354 498 A2, where detailed information can be found.

The adhesive contains a resin component, at least one thermally activatable latent curing agent for the resin component as well as, if necessary, accelerants, fillers, thixotropy aids and further common additives, wherein the resin component is available by utilizing an epoxy resin that is solid at room temperature, a resin that is liquid at room temperature and a linear polyoxypropylene with amino end groups. The epoxy resins are used in such an amount, based on the polyoxypropylene with amino end groups, that a surplus of epoxy groups with reference to the amino groups is ensured. Dicyandiamide is for example suitable as a latent curing agent.

More specific embodiments for a usable adhesive, with which the implementation of the present invention is made possible, are also disclosed in WO 93/00381.

Furthermore epoxy resin structural adhesives can be used, as for example are described in more detail in WO 00/37554.

These are compounds that contain a copolymer having at least one glass transition temperature of −30° C. or lower and, with respect to epoxide-reactive groups or a reaction product of this copolymer with a polyepoxide, furthermore a reaction product made from a polyurethane prepolymer and a polyphenol or aminophenol as well as, finally, at least one epoxy resin. To make these compounds heat-curable, they additionally contain a latent curing agent from the group dicyandiamide, guanamine, guanidine, aminoguanidine, solid aromatic diamines and/or curing accelerators. In addition they can contain softeners, reactive thinners, rheology aids, fillers, wetting agents, and/or antioxidants and/or stabilizers.

The aforementioned thermally activatable adhesive systems can be used with or without the above-described foaming agent, depending on whether an increase in volume of the adhesive during and/or after the thermal activation is sought or not.

REFERENCE NUMBER LIST

1 Bearing ring (inner ring)
2 Component (shaft)
3 Adhesive
4 Surface
5 Receiving space
6 Area
7 Gap
s Gap distance

The invention claimed is:

1. A method for fixing a bearing ring on or in a component, comprising:
  providing a bearing ring having a first side and a second side spaced axially from the first side and a circumferential side extending from the first side to the second side;
  providing a circumferential groove in the circumferential side, the circumferential groove having a first end axially inward of the first side and a second end axially inward of the second side, and a groove bottom between the first side and the second side, the groove bottom being inset from the circumferential side and the groove bottom having at least one receiving area inset relative to the groove bottom,
  providing an adhesive containing a foaming agent that is activatable to increase the volume of the adhesive,
  applying the adhesive to the groove bottom, the adhesive being sticky when the adhesive is applied to the groove bottom,
  allowing the adhesive to pre-cure on the groove bottom until the adhesive is no longer sticky,
  joining the bearing ring and the component in a desired relative position, and
  activating the foaming agent so that the adhesive increases in volume and produces an adhesive bond between the bearing ring and the component.

2. The method according to claim 1, wherein the at least one receiving area comprises first and second axially spaced receiving areas.

3. The method according to claim 2,
  wherein the first receiving area includes a first radial wall and a second radial wall, the first radial wall being defined by the first end of the circumferential groove,
  wherein the second receiving area includes a first radial wall and a second radial wall, the second radial wall being defined by the second end of the circumferential groove, and
  wherein the groove bottom extends axially from the second radial wall of the first receiving area to the first radial wall of the second receiving area.

* * * * *